United States Patent
Ponyavin et al.

(10) Patent No.: US 11,821,814 B2
(45) Date of Patent: Nov. 21, 2023

(54) LEAK DETECTION SYSTEM AND METHOD

(71) Applicant: General Electric Company, Schenectady, NY (US)

(72) Inventors: Valery Ivanovich Ponyavin, Greenville, SC (US); Miguel Angel Mendoza, Queretaro (MX); Srinivas Avishetti, Bangalore (IN); Rajesh Reddy Konatham, Bangalore (IN)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 17/204,923

(22) Filed: Mar. 17, 2021

(65) Prior Publication Data
US 2022/0299395 A1    Sep. 22, 2022

(51) Int. Cl.
  *G01M 3/02*    (2006.01)
  *F02D 41/22*   (2006.01)

(52) U.S. Cl.
  CPC ............ *G01M 3/025* (2013.01); *F02D 41/22* (2013.01); *F02D 2041/225* (2013.01)

(58) Field of Classification Search
  CPC ... G01M 3/025; F02D 41/22; F02D 2041/225
  See application file for complete search history.

(56) References Cited

U.S. PATENT DOCUMENTS

| | | | | |
|---|---|---|---|---|
| 2014/0102179 | A1* | 4/2014 | Ekanayake | F01D 21/003 73/40.5 R |
| 2015/0054650 | A1* | 2/2015 | Frish | G01M 3/226 340/605 |
| 2015/0260611 | A1* | 9/2015 | DeSilva | F23R 3/002 73/112.01 |
| 2015/0308915 | A1* | 10/2015 | Konatham | F02C 7/20 73/40.7 |
| 2018/0058972 | A1* | 3/2018 | Zhang | G01M 15/14 |
| 2019/0094100 | A1* | 3/2019 | Saha | G01M 3/38 |

FOREIGN PATENT DOCUMENTS

| | | | | |
|---|---|---|---|---|
| DE | 102018123515 A1 * | 3/2019 | | F02C 7/222 |
| EP | 2722511 A2 | 4/2014 | | |

OTHER PUBLICATIONS

Machine Translation of DE102018123515A1 PDF file name: "DE102018123515A1_Machine_Translation.pdf".*
Ultima OPIR-5 Quick Guide; MSA The Safety Company; ID 0782-010-MCe; Mar. 2017; www.MSAgasdetection.com; 2 pgs.
(Continued)

*Primary Examiner* — Grant Moubry
*Assistant Examiner* — Ruben Picon-Feliciano
(74) *Attorney, Agent, or Firm* — Fletcher Yoder, P.C.

(57) ABSTRACT

A leak detection system is provided with a first window configured to mount at a first opening in a first wall portion in an enclosure (e.g., for a gas turbine engine or other equipment in a power plant). The leak detection system includes a leak sensor configured to transmit a beam through the first window and an interior of the enclosure to obtain sensor feedback. The leak detection system includes a controller configured to evaluate the sensor feedback to monitor for a leak of a hazardous fluid in the enclosure.

20 Claims, 6 Drawing Sheets

(56) References Cited

OTHER PUBLICATIONS

Ultima OPIR-5 "Open Path Gas Detector for Hydrocarbon Gas Detection"; MSA The Safety Company; ID 07-8202-MCe; Mar. 2017; 2 pgs.
U.S. Appl. No. 16/892,469, filed Jun. 4, 2020, Valery Ivanovich Ponyvain.
European Extended Search Report for EP Application No. 22159083.9 dated Aug. 12, 2022; 8 pgs.

* cited by examiner

LEAK DETECTION SYSTEM AND METHOD

BACKGROUND

The present disclosure relates generally to leak detection for hazardous fluids, such as fuel. In particular, the present disclosure relates to systems and methods for detecting leaks in an enclosure surrounding equipment that may leak hazardous fluids.

An enclosure may be used to house a variety of equipment, such as compressors, pumps, turbines, valves, furnaces, boilers, furnaces, gasifiers, gas treatment systems such as acid gas removal (AGR) systems and carbon capture systems, and a variety of other industrial equipment. This equipment and various fluid lines disposed in the enclosure can potentially leak inside the enclosure. As an example, gas turbines engines are used in a variety of applications, including power plants. A gas turbine engine may be coupled to a generator in a stationary or mobile power plant. The gas turbine engine receives fuel for combustion in one or more combustors. The fuel, which may include liquid or gas fuel, may potentially leak within a gas turbine enclosure housing the gas turbine engine. A monitoring system may be fluidly coupled to the gas turbine enclosure to sample the air (i.e., extract the air through one or more fluid lines) to detect the presence of hazardous fluids. Unfortunately, under certain conditions, these monitoring systems may trip the power generation units (e.g., due to moisture or ice in the fluid lines), resulting in unnecessary costly shutdowns. Due to this issue, certain operators may inactivate monitoring systems and forego monitoring for hazardous gas within the gas turbine enclosure. Similar leakage problems may exist with other types of equipment, such as the equipment listed above. As a result, a need exists for an improved monitoring system to detect leaks in the enclosure surrounding such equipment.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter disclosed in the application. Indeed, the disclosed subject matter may encompass a variety of forms that may be similar to or different from the embodiments set forth below.

In a first embodiment, a system is provided with a leak detection system having a first window configured to mount at a first opening in a first wall portion in an enclosure (e.g., for a gas turbine engine or other equipment in a power plant). The leak detection system includes a leak sensor configured to transmit a beam through the first window and an interior of the enclosure to obtain sensor feedback. The leak detection system includes a controller configured to evaluate the sensor feedback to monitor for a leak of a hazardous fluid in the enclosure.

Further, in connection with the first embodiment, the leak sensor comprises a light sensor.

In connection with any preceding paragraph, the leak sensor comprises an open path infrared (OPIR) sensor.

In connection with any preceding paragraph, the leak sensor comprises a transmitter and a receiver.

In connection with any preceding paragraph, the leak detection system includes a second window configured to mount at a second opening in a second wall portion in the gas turbine enclosure; the transmitter is disposed adjacent the first window; and the receiver is disposed adjacent the second window.

In connection with any preceding paragraph, the leak sensor comprises a transceiver.

In connection with any preceding paragraph, the leak detection system comprises a reflector configured to couple to the gas turbine enclosure opposite from the first window; the transceiver is disposed adjacent the first window; the transceiver is configured to transmit the beam through the first window toward the reflector; and the reflector is configured to reflect the beam back to the transceiver.

In connection with any preceding paragraph, the leak detection system includes a second window configured to mount at a second opening in a second wall portion in the gas turbine enclosure, and the reflector is disposed adjacent the second window.

In connection with any preceding paragraph, the leak sensor is configured to mount adjacent an air vent exhaust of the gas turbine enclosure.

In connection with any preceding paragraph, the leak sensor is configured to mount in a removable roof panel of the gas turbine enclosure.

In connection with any preceding paragraph, the gas turbine enclosure includes the leak detection system.

In connection with any preceding paragraph, the system includes a gas turbine engine disposed in the gas turbine enclosure.

In connection with any preceding paragraph, a plurality of the leak sensors are configured to couple to the gas turbine enclosure in a plurality of different locations; and the controller is configured to evaluate sensor feedback from the plurality of sensors to monitor for the leak of the hazardous fluid in the gas turbine enclosure.

In connection with any preceding paragraph, the controller is configured to estimate a location of the leak based on the sensor feedback from the plurality of sensors.

In connection with any preceding paragraph, each location of the plurality of different locations includes at least two leak sensors of the plurality of leak sensors.

In connection with any preceding paragraph, a sensor mount is configured to mount the leak sensor to the gas turbine enclosure, wherein the sensor mount includes at least one of a protective housing, a thermal control system, or a vibration damper, and wherein the leak sensor is a self-contained sensor unit.

In a second embodiment, a system is provided with an enclosure (e.g., for a gas turbine engine or other equipment in a power plant) having a first window mounted at a first opening in a first wall portion of the enclosure. The system also includes a leak sensor mounted to the enclosure adjacent the first window, wherein the leak sensor is configured to transmit a beam through the first window and an interior of the enclosure to obtain sensor feedback. The sensor feedback is evaluated to monitor for a leak of a hazardous fluid in the enclosure.

In connection with the preceding paragraph describing the second embodiment, the leak sensor comprises an open path infrared (OPIR) sensor.

In connection with any preceding paragraph describing the second embodiment, a gas turbine engine is disposed in the gas turbine enclosure.

In a third embodiment, a method includes transmitting a beam through a first window at a first opening in a first wall portion in an enclosure (e.g., for a gas turbine engine or other equipment in a power plant) and through an interior of the enclosure to obtain sensor feedback. The method also includes evaluating the sensor feedback, via a controller, to monitor for a leak of a hazardous fluid in the enclosure.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

One or more specific embodiments of the disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the disclosed subject matter, the articles "a," "an," "the," and "said" are intended to mean that there are one or more of the elements. The terms "comprising," "including," and "having" are intended to be inclusive and mean that there may be additional elements other than the listed elements.

Figure 1:
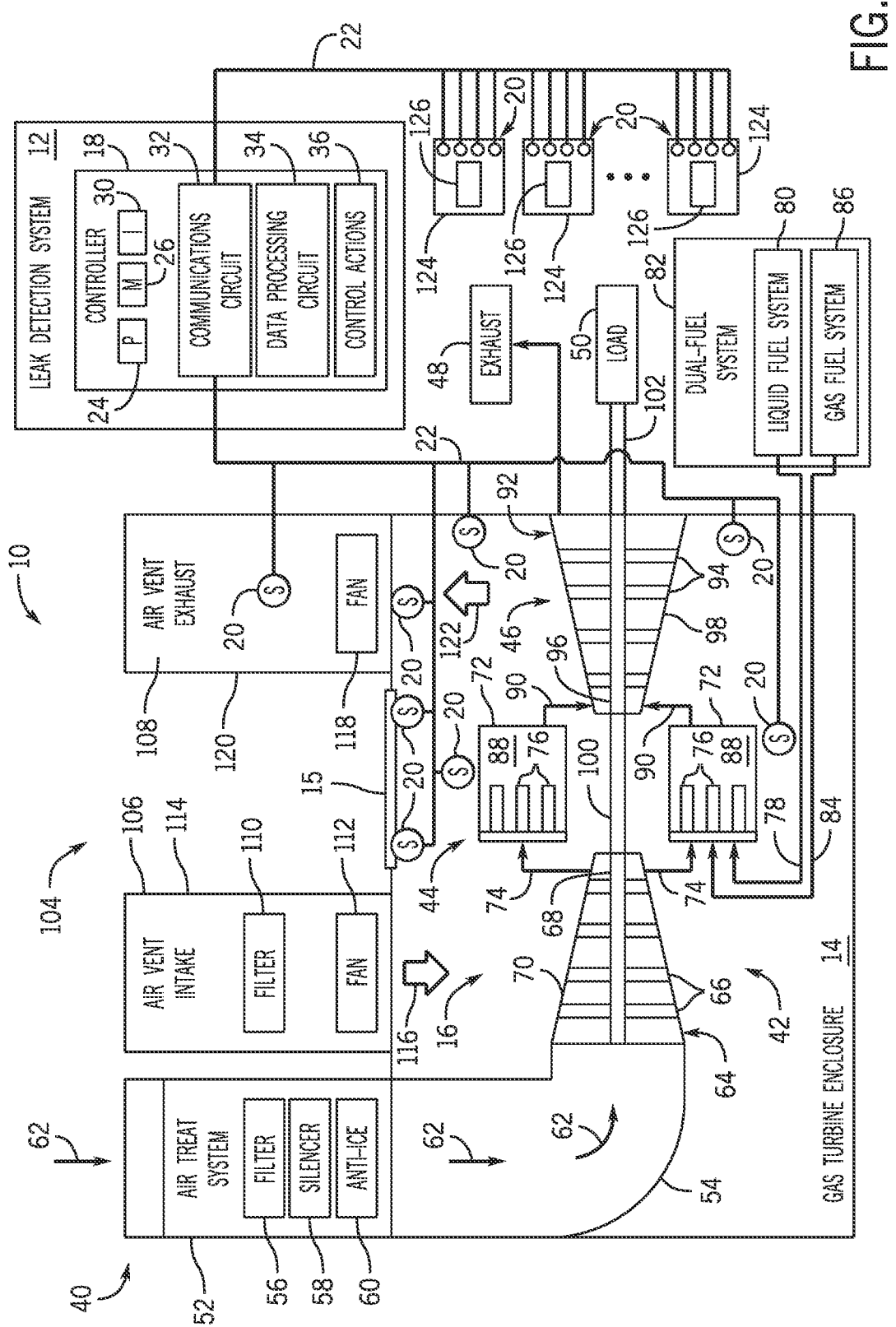
FIG. 1 is a schematic of an embodiment of a gas turbine system having a leak detection system with a plurality of sensors.

FIG. 1 is a schematic of an embodiment of a gas turbine system 10 having a leak detection system 12 coupled to a gas turbine enclosure 14 housing a gas turbine engine 16. In the illustrated embodiment, the leak detection system 12 includes a controller 18 communicatively coupled to a plurality of leak sensors 20 (e.g., open path infrared (OPIR) sensors or other types of optical/light sensors) via one or more communicational lines 22. The leak detection system 12 is configured to obtain sensor feedback from the leak sensors 20 to facilitate an identification of a fuel leak (or other hazardous fluid leak) within the gas turbine enclosure 14, such as a leak of gas or liquid fuel. However, the leak detection system 12 also may be configured to detect other types of leaks of undesirable gases within the gas turbine enclosure 14

The leak sensors 20 do not require any sampling of air from within the gas turbine enclosure 14, and the leak sensors do not require any contact with the air within the gas turbine enclosure 14. As a result, the leak sensors 20 can be mounted completely outside of the gas turbine enclosure 14 without creating any potential leak paths for an air sampling conduit. Although the illustrated embodiment shows communicational lines 22 extending between the controller 18 and the various leak sensors 20, certain embodiments of the leak detection system 12 may use wireless communications to obtain sensor data from the leak sensors 20.

The illustrated controller 18 includes a processor 24, a memory 26, and instructions 30 stored on the memory and executable by the processor 24 to perform a leak detection analysis and control. The controller 18 also includes communications circuitry 32, data processing circuitry 34, and one or more control actions 36 in response to the detected leak or other conditions within the gas turbine enclosure 14. The communications circuitry 32 may include wired and/or wireless communications circuitry to communicate with the leak sensors 20 and retrieve sensor data.

The data processing circuitry 34 is configured to process the sensor data from the leak sensors 20 and perform one or more analyses on the sensor data in order to determine if a leak has occurred or is occurring, if the leak is worsening over time, if the leak is in a particular location, if the leak is attributed to a particular type of fluid (e.g., gas fuel or liquid fuel), and/or if the leak is attributed to another event occurring in the gas turbine gas turbine system 10. The control actions 36 may include triggering an alarm, modifying operational parameters of the gas turbine engine 16, switching between different types of fuel such as liquid and gas fuel, or stopping operation of the gas turbine engine 16. The particular control actions 36 initiated by the controller 18 may depend on the type of feedback retrieved from the leak sensors 20. For example, if the leak sensors 20 indicate a leakage of liquid fuel, then the control action 36 may trigger a change from liquid fuel operation to gas fuel operation. If the sensor feedback indicates a gradually increasing amount of leakage within the gas turbine enclosure 14 and/or a leakage level above one or more thresholds, then the control actions 36 may trigger an alarm, a corrective action, and/or a shutdown of the gas turbine engine 16.

As discussed in further detail below, the leak sensors 20 may include a variety of sensor types, such as an optical/light sensor (e.g., an open path infrared (OPIR) sensor). Each depicted sensor 20 may include one or more transceivers (e.g., OPIR transceivers) or one or more pairs of transmitters and receivers (e.g., OPIR transmitters and receivers). Details of the leak detection system 12 will be discussed in further detail below after providing context for the gas turbine system 10.

The illustrated gas turbine engine 16 includes an air intake section 40, a compressor section 42, a combustor section 44, a turbine section 46, an exhaust section 48, and one or more loads 50. The air intake section 40 includes an air treatment system 52 disposed in an intake duct 54 extending from an exterior of the gas turbine enclosure 14 and into the gas turbine enclosure 14 to connect with the compressor section 42. The air treatment system 52 includes one or more air filters 56, one or more silencers 58, and an anti-ice system 60. The air intake section 40 routes an air flow 62 through the intake duct 54 to the compressor section 42, while filtering the air flow 62 with the one or more air filters 56, reducing noise in the air intake section 40 with the one or more silencers 58, and inhibiting ice formation in the air flow 62 with the anti-ice system 60. The air flow 62 then passes through the compressor section 42, which includes a single stage or multi-stage compressor 64. In the illustrated embodiment, the compressor 64 has a plurality of stages of compressor blades 66 coupled to a compressor shaft 68 within an outer compressor casing 70. Although the illustrated embodiment shows four compressor stages, the compressor 64 may include between 1 and 28 or more compressor stages to compress the air flow 62 before entering the combustor section 44.

The compressed air is then directed into a plurality of combustors 72 of the combustor section 44 as illustrated by arrows 74. Each combustor 72 in the combustor section 44 may include one or more fuel nozzles 76. The fuel nozzles 76 are configured to mix the compressed air 74 with one or more fuels, such as a liquid fuel delivered along a liquid fuel line 78 (or liquid fuel circuit or flow path) from a liquid fuel system 80 of a dual fuel system 82 and/or a gas fuel delivered along a gas fuel line 84 (or gas fuel circuit or flow path) from a gas fuel system 86 of the dual fuel system 82. The fuel nozzles 76 may be configured to use only one of the liquid fuel or the gas fuel for a liquid fuel operation or a gas fuel operation, respectively. However, the fuel nozzles 76 also may be configured to simultaneously use both the liquid fuel and the gas fuel for combustion in the combustor 72, for example, during a transition between liquid and gas fuel operation.

The liquid fuel and the gas fuel may be selected from a variety of fuel types and compositions. For example, the gas fuel may include natural gas, synthetic gas (or syngas), hydrogen, methane, or another suitable gas turbine fuel. Regardless of the specific type of fuel being used in the combustors 72, the fuel nozzles 76 mix the fuel with the compressed air 74, and the fuel-air mixture ignites in a combustion chamber 88 to generate hot combustion gases 90, which are then directed into the gas turbine section 46.

The gas turbine section 46 may include a single stage or multi-stage turbine 92, which includes one or more stages of turbine blades 94 coupled to a turbine shaft 96 within a turbine casing 98. For example, in certain embodiments, the turbine 92 may include between 1 and 28 turbine stages of turbine blades 94. As the hot combustion gases 90 flow through the turbine section 46, the gases 90 drive rotation of the turbine blades 94 and the turbine shaft 96. In turn, rotation of the turbine shaft 96 drives rotation of the compressor 64 via an intermediate shaft 100 coupled to the compressor shaft 68, and drives rotation of the load 50 via a shaft 102. Although separate shafts 68, 96, 100, and 102 may be used with the gas turbine engine 16, certain embodiments of the gas turbine engine 16 may include one or more common shafts between the compressor section 42, the turbine section 46, and the load 50. The load 50 may include a generator, industrial machinery, a vehicle propulsion system, or any other suitable equipment.

The gas turbine enclosure 14 generally surrounds the gas turbine engine 16 and provides a protective barrier around the gas turbine engine 16. For example, the gas turbine enclosure 14 may substantially contain the heat generated by combustion in the combustor section 44, and the gas turbine enclosure 14 may provide a containment for safety reasons. The gas turbine system 10 also includes a ventilation system 104 coupled to the gas turbine enclosure 14. As illustrated, the ventilation system 104 includes an air vent intake 106 and air vent exhaust 108 coupled to the gas turbine enclosure 14. The air vent intake 106 includes one or more air filters 110 and one or more fans 112 disposed in an intake duct 114, thereby directing and filtering an air flow into the gas turbine enclosure 14 as illustrated by arrow 116. Similarly, the air vent exhaust 108 includes one or more fans 118 disposed in an exhaust duct 120 to route the ventilation flow out of the gas turbine enclosure 14 as illustrated by arrow 122. Although the air vent intake 106 and the air vent exhaust 108 may each include fans 112 and 118, in certain embodiments, the fans may be disposed in only one of the air vent intake 106 or the air vent exhaust 108. In operation, the ventilation system 104 circulates the air flow through the gas turbine enclosure 14 as illustrated by arrows 116 and 122, thereby withdrawing heat and/or any leaked fluids (e.g., leaked fuel) out of the gas turbine enclosure 14. However, if any leakage occurs inside the gas turbine enclosure 14, the leak detection system 12 is configured to identify the leaks and enable certain control actions 36.

The leak detection system 12 is communicatively coupled to the plurality of leak sensors 20 that are coupled to the gas turbine enclosure 14 of the gas turbine system 10 and to one or more sensors 20 that are coupled to enclosures 124 housing turbomachines 126. In certain embodiments, the turbomachines 126 may include additional gas turbine engines similar to the gas turbine engine 16 disposed inside the gas turbine enclosure 14. However, the turbomachines 126 also may include other equipment, such as combustion systems, gas compressors, reciprocating piston-cylinder combustion engines, boilers, gas treatment systems (e.g., sulfur removal units) for treating a syngas generated by a gasifier (e.g., using coal or another fuel feedstock), or other equipment having a potential for leakage of fuels or hazardous gases.

The leak detection system 12 is configured to simultaneously monitor sensor feedback from the leak sensors 20 disposed in each of these systems and provide appropriate control actions 36. If the gas turbine engine 16 and the turbomachines 126 are functionally related and/or dependent on one another as part of a larger system, such as a power plant, then the leak detection system 12 may coordinate the control actions 36 between the gas turbine engine 16 and the turbomachines 126. However, in certain embodiments, the gas turbine engine 16 and the turbomachines 126 may be independent from one another, such that the leak detection system 12 can provide independent control actions 36 to the gas turbine engine 16 and the various turbomachines 126.

In each of these systems, the leak sensors 20 may be distributed at different locations about the gas turbine enclosure 14, which may provide redundancy in the sensor measurement and also provide additional information regarding the location of any potential leak occurring in the particular enclosure (e.g., 14 and 124). For example, as illustrated with the gas turbine enclosure 14, the leak sensors 20 are distributed at various locations along the gas fuel line 84 and the liquid fuel line 78, the combustors 72, and the air vent exhaust 108. By further example, the leak sensors 20 may be coupled to a removable roof panel 15 (or other removable access panel) of the gas turbine enclosure 14. Accordingly, the leak sensors 20 may obtain sensor feedback indicative of a greater or lesser presence of leakage in certain locations of the gas turbine enclosure 14, such that the controller 18 can estimate a specific location of the leak, a potential component having a leak, a possible corrective measure, and a possible control actions 36 in the event that the leak cannot be corrected. As discussed in further detail below, the leak sensors 20 also may be configured to identify a specific type of fuel leak, such as a type of liquid fuel or gas fuel.

In certain embodiments, the leak sensors 20 are non-intrusive, non-contact sensors, such as optical sensors, disposed outside of the gas turbine enclosure 14. For example, the leak sensors 20 may transmit and receive an optical beam (e.g., a beam of light or radiation) through an interior of the gas turbine enclosure 14, such that changes in characteristics of the optical beam can be analyzed to determine whether or not a leak is occurring inside the gas turbine enclosure 14. For example, the leak sensors 20 and/or the data processing circuitry 34 of the controller 18 may be configured to analyze changes in the optical beam passing through the gas turbine enclosure 14 to determine a composition of any fluid leakage inside the gas turbine enclosure 14.

The sensors 20 may include infrared (IR) light sensors, laser sensors, electromagnetic radiation sensors, or any other suitable optical-based sensor. In particular, the disclosed leak sensor 20 may include an open path infrared (OPIR) sensor. The OPIR sensors 20 may include a pair of a transmitter and a receiver or a pair of a transceiver and a reflector (e.g., a retroreflector). The reflector may include a reflective panel having a substrate layer and a reflective layer (e.g., a mirror layer). Details of the sensors 20 will be described in further detail below with reference to FIGS. 2-5.

The OPIR sensor 20 is configured to direct a beam of infrared light through the gas turbine enclosure 14. The presence of a potential fuel leak in the gas turbine enclosure 14 can be detected due to an absorption of an infrared wavelength in the beam of infrared light. For example, a particular infrared wavelength may correspond to a particular fuel type, such as a particular liquid fuel, a particular gas fuel, or other hazardous fluid within the gas turbine enclosure 14. Accordingly, the OPIR sensor 20 is configured to detect specific types of leakages within the gas turbine enclosure 14, such that the controller 18 can identify possible corrective actions 36 for the gas turbine engine 16.

FIGS. 2, 3, 4, and 5 are schematics of embodiments of the sensors 20 coupled to an exterior of the gas turbine enclosure 14 housing the gas turbine engine 16. For example, the sensors 20 may be disposed on opposite sides of the gas turbine enclosure 14 in the vicinity of the air vent exhaust 108. However, the sensors 20 may be disposed in other wall portions of the gas turbine enclosure 14 as illustrated in FIG. 1.

Figure 2:
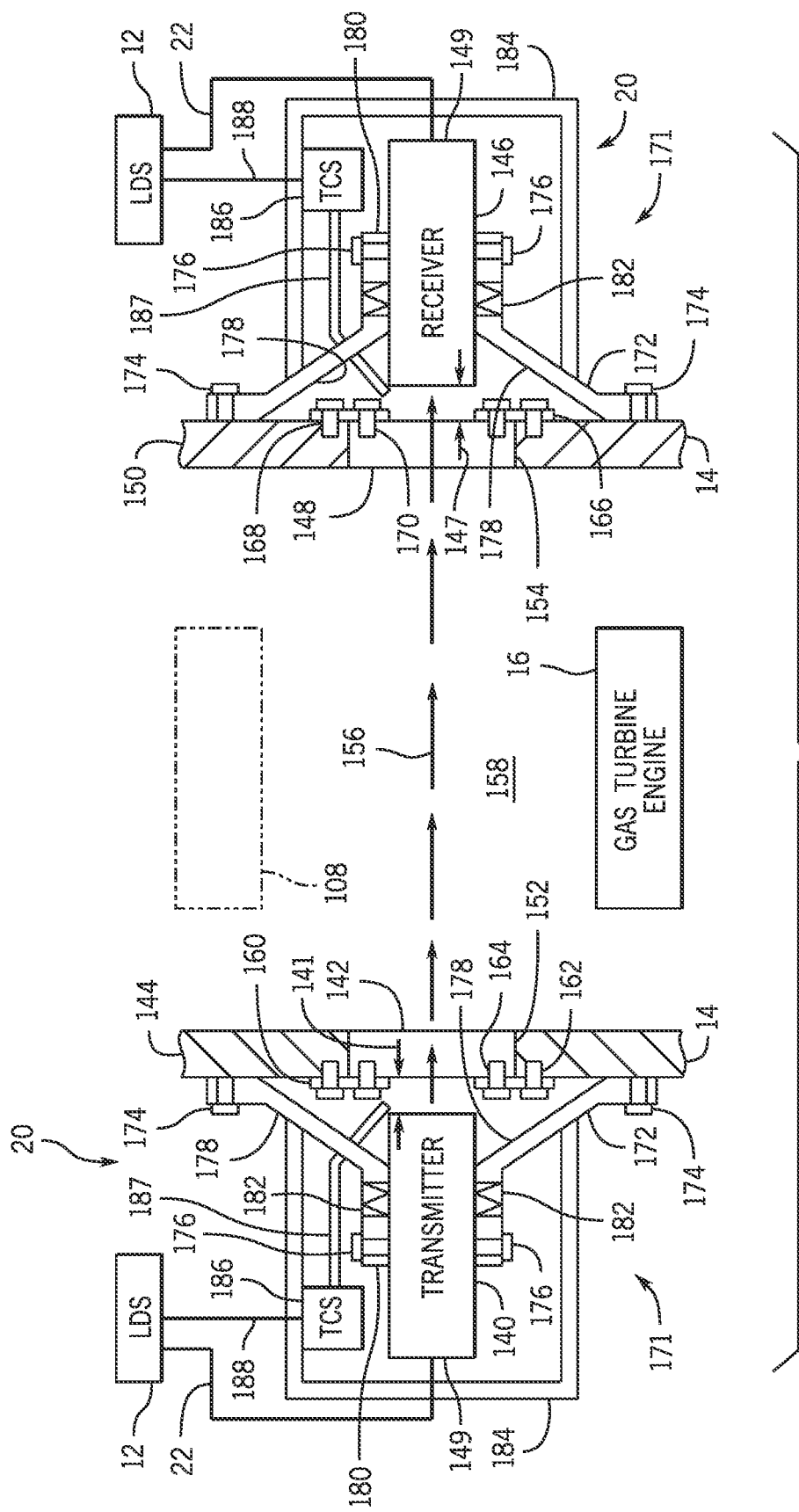
FIG. 2 is a schematic of an embodiment of the leak detection system having a first sensor (e.g., transmitter) disposed at a first window in a first wall portion and a second sensor (e.g., receiver) disposed at a second window in a second wall portion of a gas turbine enclosure.

As illustrated in FIG. 2, the leak sensors 20 may include a transmitter 140 disposed adjacent a first window 142 in a first wall portion 144 of the gas turbine enclosure 14 and a receiver 146 disposed adjacent a second window 148 in a second wall portion 150 of the gas turbine enclosure 14. For example, the transmitter 140 may include an optical or light transmitter, such as an IR transmitter, a laser transmitter, or an OPIR transmitter. Similarly, the receiver 146 may include an optical or light receiver, such as an IR receiver, a laser receiver, or an OPIR receiver, respectively.

The first window 142 is disposed in or at an opening or cut-out 152 in the first wall portion 144, while the second window 148 is disposed in or at an opening or cut-out 154 in the second wall portion 150. Each of the windows 142 and 148 may be a transparent sheet of material, such as a glass sheet or panel (e.g., sapphire window panel). The windows 142 and 148 may include a single layer or multiple layers of transparent material. The first and second windows 142 and 148 are configured to enable an optical beam 156 (e.g., a light beam, infrared beam, laser beam, etc.) to pass from the transmitter 140, through the first window 142 across an internal space 158 within the enclosure 14, through the second window 148, and into the receiver 146. In this way, the transmitter 140 and the receiver 146 are completely external from the internal space 158 of the gas turbine enclosure 14, such that the transmitter 140 and the receiver 146 are not exposed to the higher temperatures within the gas turbine enclosure 14. Additionally, the external position of the transmitter 140 and the receiver 146 facilitates easier access for installation, inspection, and maintenance.

The first window 142 may be mounted to the first wall portion 144 via one or more mounts 160, such as a rectangular or annular flange, which may be fastened to both the first wall portion 144 and the first window 142. For example, the mount 160 may be fastened to the first wall portion 144 with a plurality of threaded fasteners 162 (e.g., bolts), and the mount 160 may be fastened to the first window 142 with a plurality of threaded fasteners 164 (e.g., bolts). Similarly, the second window 148 may be mounted to the second wall portion 150 via one or more mounts 166, such as a rectangular or annular shaped flange. For example, the mount 166 may be fastened to the second wall portion 150 via a plurality of threaded fasteners 168 (e.g., bolts), and the mount 166 may be fastened to the second window 148 with a plurality of threaded fasteners 170 (e.g., bolts). Although the illustrated embodiment uses threaded fasteners 162, 164, 168, and 170 for the mounts 160 and 166, certain embodiments may include other fasteners or joints, such as a welded joint, a hinged joint, a latch, a dovetail joint, an interference fit or shrink fit, an adhesive, and/or any suitable fixed or removable joint.

The transmitter 140 may be coupled to the first wall portion 144 with a mounting system 171. The illustrated mounting system 171 may include at least one mount 172, which may be fastened to the first wall portion 144 with a plurality of threaded fasteners 174 (e.g., bolts). The mount 172 also may be fastened to the transmitter 140 with a plurality of threaded fasteners 176 (e.g., bolts). In some embodiments, threaded fasteners 174 and 176 may be replaced or supplemented with other fasteners, such as a welded joint, a hinged joint, a latch, a dovetail joint, an interference fit or shrink fit, an adhesive, and/or any suitable fixed or removable joint. In the illustrated embodiment, the mount 172 has angled arms 178 extending outwardly from a central body 180. The central body 180 is disposed about the transmitter 140, and the central body 180 also may include a vibration damper or shock absorber 182. For example, the vibration damper 182 may include one or more springs, shock absorbing material, a piston cylinder assembly, or a combination thereof. The vibration damper 182 may be configured to reduce vibration associated with operation of the gas turbine engine 16. However, certain embodiments of the mount 172 may exclude the vibration damper 182.

In certain embodiments, the mount 172 also may include a protective housing 184 disposed about the transmitter 140. The protective housing 184 may be configured to protect the transmitter 140 from heat, electrical interference, or impact damage. For example, the protective housing 184 may include one or more layers of electrical insulation, thermal insulation, and structural protection. The transmitter 140 also may include a thermal control system 186 configured to provide ventilation and/or a thermal flow (e.g., a cooling flow and/or a heating flow) through the protective housing 184. The thermal control system 186 may include one or more fans, a liquid thermal control system (e.g., liquid heating/cooling system) having one or more pumps and heat exchangers, an electric heater, or any combination thereof. The thermal control system 186 may be configured to maintain a temperature (e.g., by heating and/or cooling) within an interior of the protective housing 184, and the transmitter 140, within a desired temperature range (i.e., between upper and lower temperature thresholds). The thermal control system 186 may include one or more fluid injection ducts 187, which are configured to direct a thermal flow (e.g., a cleaning fluid jet, a cooling flow and/or heating flow) against the window (e.g., first window 142). For example, the thermal flow from the ducts 187 may be configured to clear the window of any debris, moisture, ice, or other contaminants. The thermal control system 186 is communicatively coupled to the leak detection system 12 via one or more control lines 188. However, certain embodiments of the mount 172 may exclude the protective housing 184 and/or the thermal control system 186. For example, in certain embodiments, the transmitter 140 may be at least partially or entirely exposed to the environment (i.e., without the protective housing 184 and the thermal control system 186), such that the ambient temperature and weather (e.g., wind, rain, snow, and/or hail) helps to maintain a suitable temperature of the transmitter 140. The transmitter 140 also may be spaced apart from the first window 142 by a distance 141 sufficient to reduce the transfer of heat and vibration from the gas turbine enclosure 14 to the transmitter 140.

In the illustrated embodiment, the receiver 146 has substantially the same mounting system 171 as the transmitter 140. In particular, the mount 172, which may be coupled to the second wall portion 150 and the receiver 146 via respective fasteners 174 and 176, includes the angled arms 178 and the central body 180 having the vibration damper 182. Additionally, similarly to the transmitter 140, the receiver 146 has the protective housing 184 with the thermal control system 186 communicatively coupled to the leak detection system 12 via the one or more control lines 188. The thermal control system 186 may include one or more fluid injection ducts 187, which are configured to direct a thermal flow (e.g., a cleaning fluid jet, a cooling flow and/or heating flow) against the window (e.g., second window 150). Accordingly, the receiver 146 has substantially the same features as described above with reference to the mounting system 171 for the transmitter 140.

Similar to the transmitter 140, certain embodiments of the mount 172 may exclude the protective housing 184 and/or the thermal control system 186 for the receiver 146. For example, in certain embodiments, the receiver 146 may be at least partially or entirely exposed to the environment (i.e., without the protective housing 184 and the thermal control system 186), such that the ambient temperature and weather (e.g., wind, rain, snow, and/or hail) helps to maintain a suitable temperature of the receiver 146. The receiver 146 also may be spaced apart from the second window 148 by a distance 147 sufficient to reduce the transfer of heat and vibration from the gas turbine enclosure 14 to the receiver 146.

Each of the transmitter 140 and the receiver 146 is a self-contained unit (i.e., a prepackaged unit), in which all electronics, circuits, optical elements, lenses, memory, processors, etc. are contained in a dedicated sensor housing 149 of the respective transmitter 140 or receiver 146. Accordingly, the protective housing 184, the thermal control system 186, and the vibration damper 182 are configured to adapt and enhance the transmitter 140 and the receiver 146 for use with the environment of the gas turbine system 10. The sensor 20 configuration of FIG. 2 may be used at any one or more of the sensor locations illustrated in FIG. 1.

Figure 3:
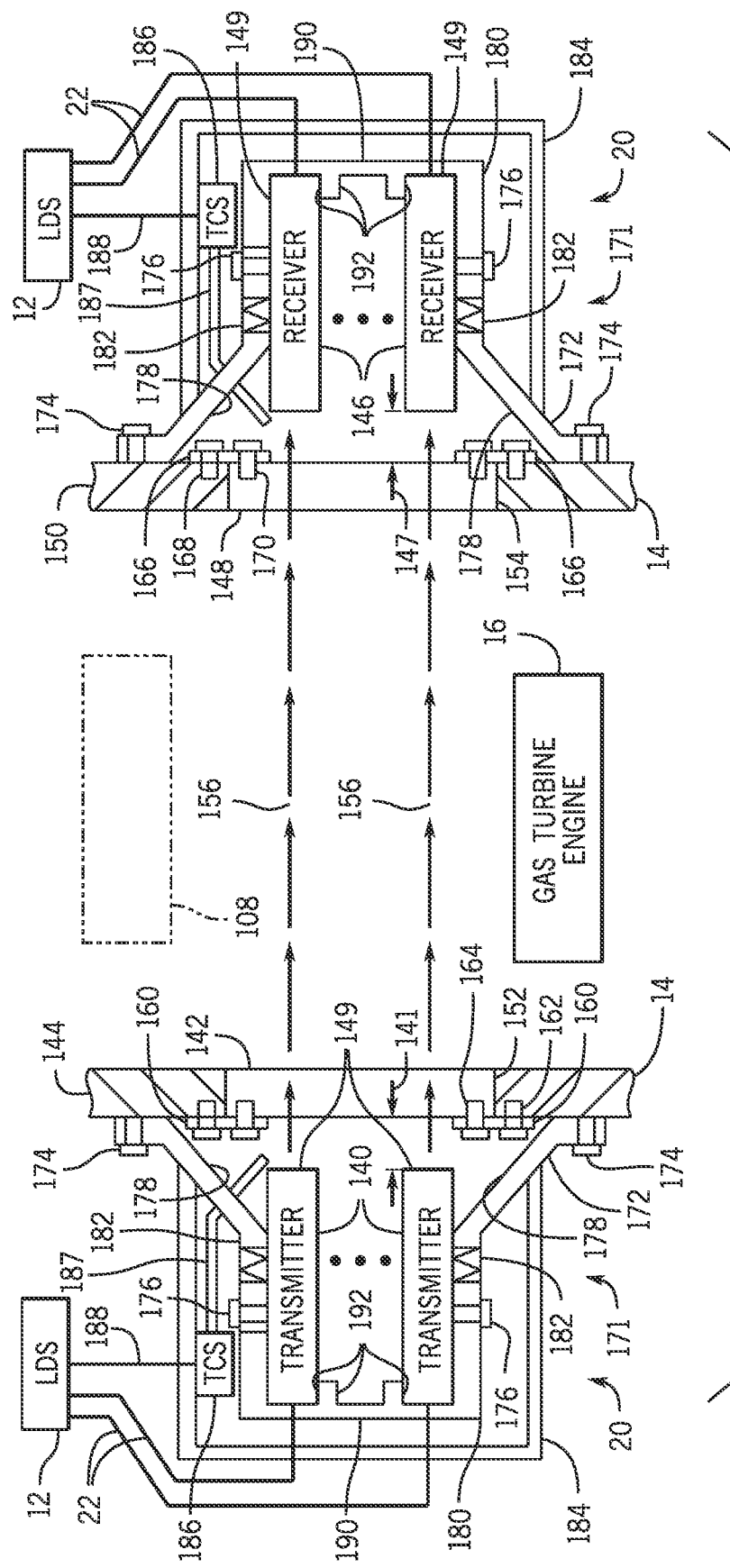
FIG. 3 is a schematic of an embodiment of the leak detection system having multiple first sensors (e.g., transmitters) disposed at the first window in the first wall portion and multiple second sensors (e.g., receivers) disposed at the second window in the second wall portion of the gas turbine enclosure.

FIG. 3 is a schematic of an embodiment of the leak detection system 12 having sensors 20 disposed on first and second wall portions 144 and 150 of the gas turbine enclosure 14, in which each sensor 20 includes a plurality of transmitters 140 on the first wall portion 144 and a plurality of receivers 146 on the second wall portion 150. Otherwise, the embodiment of FIG. 3 is substantially the same as the embodiment of FIG. 2. Accordingly, like reference numbers are used in FIGS. 2 and 3 to depict the same components described above with reference to FIG. 2. The differences will be described in detail below.

At the first wall portion 144, the mount 172 is substantially the same as depicted in FIG. 2, except that the central body 180 of the mount has an intermediate support 190 extending between the angled arms 178. The intermediate support 190 defines a plurality of recesses 192 configured to support ends of the plurality of transmitters 140. Although only two transmitters 140 are depicted in FIG. 3, the illustrated embodiment may include any number of transmitters 140 (e.g., 2, 3, 4, 5 6, or more) disposed within the mount 172. The mount 172 supporting the receivers 146 at the second wall portion 150 is substantially the same as the mount 172 supporting the transmitters 140 at the first wall portion 144. As illustrated, the mount 172 supporting the receivers 146 has the intermediate support 190 extending between the angled arms 178, and the intermediate support 190 includes the plurality of recesses 192 configured to support end portions of the plurality of receivers 146.

In the illustrated embodiment, the mounts 172 for the transmitters 140 and the receivers 146 are substantially the same as one another. However, certain modifications may be made to accommodate different sizes or configurations of the transmitters 140 and the receivers 146. In the illustrated embodiment, the transmitters 140 and the receivers 146 may be spaced at a uniform or non-uniform spacing relative to one another. The plurality of transmitters 140 and receivers 146 may be configured to obtain redundant measurements in a particular location of the gas turbine enclosure 14, or the plurality of transmitters 140 and receivers 146 may be configured to provide additional spatial information relating to the sensor measurements in a particularly sensitive area of the gas turbine enclosure 14. The sensor 20 configuration of FIG. 3 may be used at any one or more of the sensor locations illustrated in FIG. 1.

Figure 4:
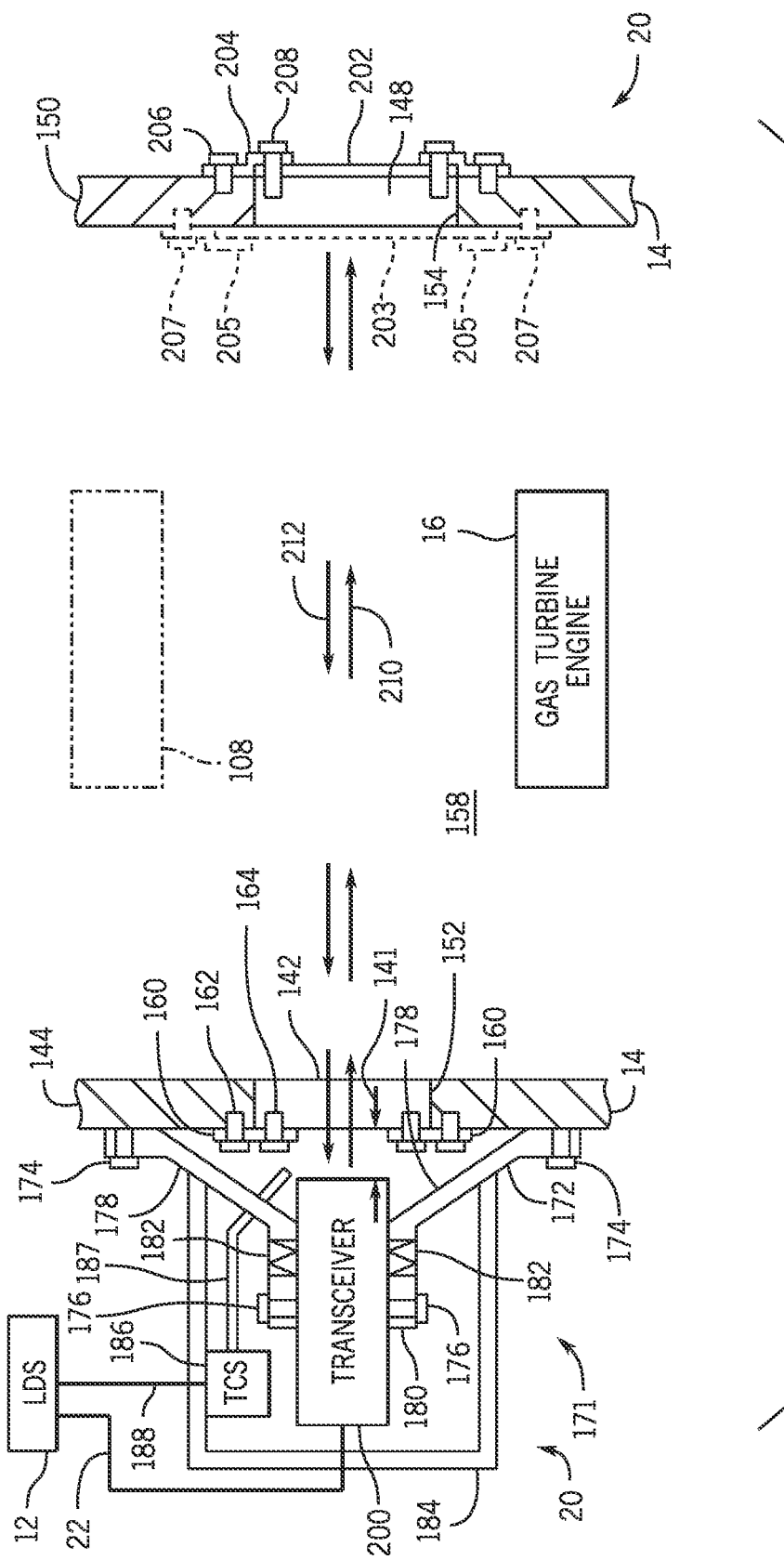
FIG. 4 is a schematic of an embodiment of the leak detection system having a sensor (e.g., transceiver) disposed at the first window in the first wall portion and a reflector disposed at the second window in the second wall portion of the gas turbine enclosure.

FIG. 4 is a schematic of an embodiment of the leak detection system 12 having leak sensors 20 coupled to the gas turbine enclosure 14. The embodiment of FIG. 4 is similar to the embodiment of FIG. 2 as described above, except that the transmitter 140 is replaced with a transceiver 200 at the first wall portion 144 and the receiver 146 is replaced with a reflector 202 at the second wall portion 150. Accordingly, the mounting system 171 at the first wall portion 144 is substantially the same as described above with reference to FIG. 2. The transceiver 200 is mounted to the first wall portion 144 with the mount 172 having the central body 180 with the angled arms 178. The central body 180 also includes the vibration damper 182 as described above. The transceiver 200 is protected by the protective housing 184 and is provided with a thermal flow (e.g., a cooling flow and/or a heating flow) by the thermal control system 186. The thermal control system 186 may include one or more fluid injection ducts 187, which are configured to direct a thermal flow (e.g., a cleaning fluid jet, a cooling flow and/or heating flow) against the window (e.g., first window 142). The first window 142 is mounted to the first wall portion 144 with the mount 160 and threaded fasteners 162 and 164.

As discussed above, certain embodiments of the mount 172 may exclude the protective housing 184 and/or the thermal control system 186. For example, in certain embodiments, the transceiver 200 may be at least partially or entirely exposed to the environment (i.e., without the protective housing 184 and the thermal control system 186), such that the ambient temperature and weather (e.g., wind, rain, snow, and/or hail) helps to maintain a suitable temperature of the transceiver 200. The transceiver 200 also may be spaced apart from the first window 142 by a distance 141 sufficient to reduce the transfer of heat and vibration from the gas turbine enclosure 14 to the transceiver 200.

The second wall portion 150 may be configured with a reflector 202 (e.g., an externally mounted reflector in a first embodiment) or a reflector 203 (e.g., an internally mounted reflector in a second embodiment). In the first embodiment having the reflector 202 on the second wall portion 150, the second window 148 and the reflector 202 may be mounted to the second wall portion 150 in a similar manner as described above with reference to FIG. 2. In particular, the second window 148 is disposed at or in the opening or cut-out 154, the reflector 202 is disposed against an exterior surface of the second window 148, and a mount 204 (e.g., a rectangular or annular flange) secures both the second window 148 and the reflector 202 to the second wall portion 150. As illustrated, the mount 204 is coupled to the second wall portion 150 with a plurality of threaded fasteners 206 (e.g., bolts), and the mount 204 is coupled to the second window 148 and the reflector 202 with a plurality of threaded fasteners 208 (e.g., bolts). Although the illustrated embodiment uses threaded fasteners 162, 164, 206, and 208 for the mounts 160 and 204, certain embodiments may include other fasteners or joints, such as a welded joint, a hinged joint, a latch, a dovetail joint, an interference fit or shrink fit, an adhesive, and/or any suitable fixed or removable joint.

In operation of the first embodiment, the transceiver 200 is configured to transmit an optical beam 210 through the first window 142, through the internal space 158, through the second window 148 and against the reflector 202, which in turn reflects a return optical beam 212 back to the transceiver 200. The received beam 212 is then processed by the transceiver 200 and/or the controller 18 to evaluate whether or not a leak is occurring in the gas turbine enclosure 14.

The transceiver 200 may include an optical or light transceiver, such as an IR transceiver, a laser transceiver, or an OPIR transceiver. The illustrated transceiver 200 is a self-contained transceiver unit (i.e., a prepackaged unit), in which all electronics, circuits, optical elements, lenses, memory, processors, etc. are contained in a dedicated sensor housing of the transceiver 200. Accordingly, the protective housing 184, the thermal control system 186, and the vibration damper 182 are configured to adapt and enhance the illustrated transceiver 200 for use with the environment of the gas turbine system 10. The sensor 20 configuration of FIG. 4 may be used at any one or more of the sensor locations illustrated in FIG. 1.

In the second embodiment having the reflector 203 rather than the reflector 202, the reflector 203 may be mounted to an interior surface of the second wall portion 150 via a mount 205 (e.g., a rectangular or annular flange) and a plurality of threaded fasteners 207 (e.g., bolts). Additionally, the opening or cut-out 154, the second window 148, the reflector 202, the mount 204, and the threaded fasteners 206 and 208 may be excluded when using the reflector 203, thereby eliminating any potential leak paths in the second wall portion 150. In operation of the second embodiment, the transceiver 200 is configured to transmit an optical beam 210 through the first window 142, through the internal space 158, and against the reflector 203, which in turn reflects a return optical beam 212 back to the transceiver 200. The received beam 212 is then processed by the transceiver 200 and/or the controller 18 to evaluate whether or not a leak is occurring in the gas turbine enclosure 14.

Figure 5:
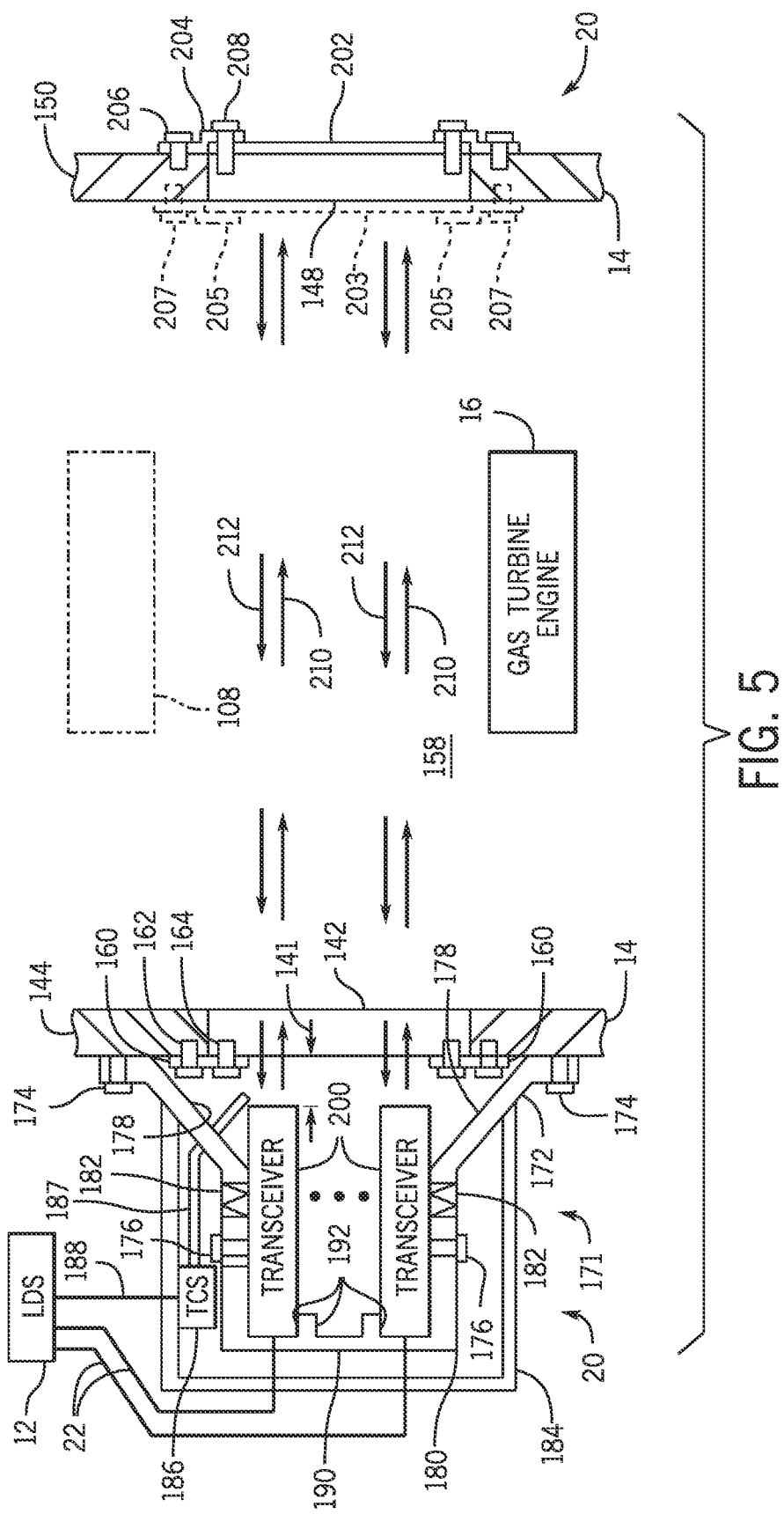
FIG. 5 is a schematic of an embodiment of the leak detection system having multiple sensors (e.g., transceivers) disposed at the first window in the first wall portion and the reflector disposed at the second window in the second wall portion of the gas turbine enclosure.

FIG. 5 is a schematic of an embodiment of the leak detection system 12 having sensors 20 configured to detect fuel leaks inside the gas turbine enclosure 14. In the illustrated embodiment, the mounting system 172 and sensor 20 configuration disposed on the first wall portion 144 are substantially the same as described above with reference to FIG. 3, except that the transmitters 140 are replaced with transceivers 200 as described with reference to FIG. 4. Accordingly, the transceivers 200 of FIG. 5 are disposed in substantially the same mount 172 of FIG. 3. The mount 172 includes the angled arms 174 extending from the central body 180 having the vibration dampers 182. The mount 172 also includes the intermediate support 190 having the plurality of recesses 192 configured to support the plurality of transceivers 200. The transceivers 200 are also protected by the protective housing 184 having the thermal control system 186. The thermal control system 186 may include one or more fluid injection ducts 187, which are configured to direct a thermal flow (e.g., a cleaning fluid jet, a cooling flow and/or heating flow) against the window (e.g., first window 142).

In certain embodiments, the mount 172 may exclude the protective housing 184 and/or the thermal control system 186. The first wall portion 144 also has the first window 142 disposed at or in the opening or cut-out 152, and the first window 142 is coupled to the first wall portion 44 with the mount 160 and threaded fasteners 162 and 164. The transceivers 200 also may be spaced apart from the first window 142 by a distance 141 sufficient to reduce the transfer of heat and vibration from the gas turbine enclosure 14 to the transceivers 200.

The second wall portion 150 has a similar configuration as discussed above with reference to FIG. 4, which may include the reflector 202 (e.g., an externally mounted reflector in a first embodiment) or the reflector 203 (e.g., an internally mounted reflector in a second embodiment). In the first embodiment having the reflector 202, the second window 148 is disposed at or in the opening or cut-out 154 in the second wall portion 150, the reflector 202 is disposed against an outer surface of the second window 148, and the mount 204 couples both the second window 148 and the reflector 202 to the second wall portion 150. Similarly to FIG. 4, the mount 204 is coupled to the second wall portion 150 with the plurality of threaded fasteners 206, and the mount 204 is coupled to the second window 148 and the reflector 202 with the plurality of threaded fasteners 208.

In the first embodiment, the transceivers 200 and the reflector 202 operate substantially the same as discussed above with reference to FIG. 4. In particular, each transceiver 200 is configured to transmit an optical beam 210 through the first window 142, through the internal space 158, through the second window 148 and against the reflector 202, which in turn reflects a return optical beam 212 back to the transceiver 200. The transceivers 200 and/or the controller 18 then process the received optical beams 212 to evaluate whether or not a fuel leak is occurring in the gas turbine enclosure 14.

Similarly to FIG. 3, the transceivers 200 are spaced uniformly or non-uniformly with respect to one another. The transceivers 200 may be configured to provide redundant measurements or measurements that provide spatial information about potential leaks within the gas turbine enclosure 14. The sensor 20 configuration of FIG. 5 may be used at any one or more of the sensor locations illustrated in FIG. 1.

In the second embodiment having the reflector 203 rather than the reflector 202, the reflector 203 may be mounted to the interior surface of the second wall portion 150 via the mount 205 and the threaded fasteners 207 (e.g., bolts). Additionally, the opening or cut-out 154, the second window 148, the reflector 202, the mount 204, and the threaded fasteners 206 and 208 may be excluded when using the reflector 203, thereby eliminating any potential leak paths in the second wall portion 150. In operation of the second embodiment, the transceiver 200 is configured to transmit an optical beam 210 through the first window 142, through the internal space 158, and against the reflector 203, which in turn reflects a return optical beam 212 back to the transceiver 200. The received beam 212 is then processed by the transceiver 200 and/or the controller 18 to evaluate whether or not a leak is occurring in the gas turbine enclosure 14.

Figure 6:
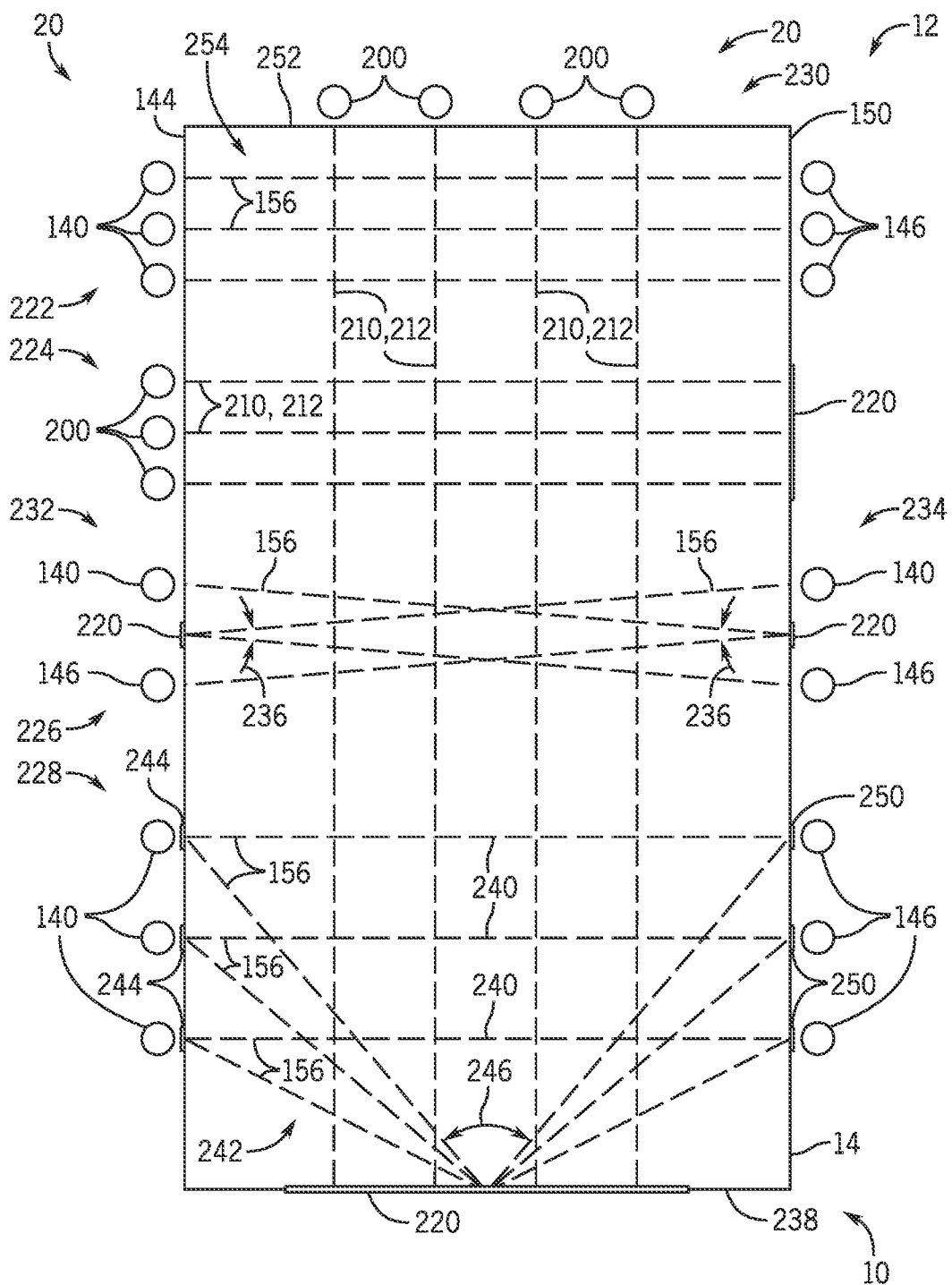
FIG. 6 is a schematic of an embodiment of the leak detection system having a plurality of different configurations of sensors (e.g., transmitters, receivers, transceivers, and reflectors) coupled to the gas turbine enclosure.

FIG. 6 is a schematic of an embodiment of the leak detection system 12 having a plurality of different configurations of sensors 20 (e.g., transmitters 140, receivers 146, transceivers 200, and reflectors 220) coupled to the gas turbine enclosure. The transmitters 140, receivers 146, and transceivers 200 may have substantially the same features as discussed in detail above with reference to FIGS. 1-5, including the windows 142 and 148, the mounting system 171, the protective housing 184, the vibration damper 182, the protective housing 184, and the thermal control system 186. However, in certain embodiments, the transmitters 140, receivers 146, and transceivers 200 may exclude the protective housing 184 and/or the thermal control system 186. The reflectors 220 may include the reflector 202 (e.g., an externally mounted reflector outside of a window in a first embodiment) or the reflector 203 (e.g., an internally mounted reflector in a second embodiment). In the illustrated embodiment, the leak detection system 12 includes a first sensor configuration 222, a second sensor configuration 224, a third sensor configuration 226, a fourth sensor configuration 228, and a fifth sensor configuration 230. These sensor configurations 222, 224, 226, 228, and 230 may be used independent from one another or in various combinations with one another.

The first sensor configuration 222 may be substantially the same as discussed above with reference to FIGS. 2 and 3, including the transmitters 140 and the receivers 146 on opposite sides of the gas turbine enclosure 14. The second sensor configuration 224 may be substantially the same as discussed above with reference to FIGS. 4 and 5, including the transceivers 200 and reflectors 220 (e.g., reflectors 202 or 203) on opposite sides of the gas turbine enclosure 14. The third sensor configuration 226 includes a first sensor set 232 having the transmitter 140 and the receiver 146 on the first wall portion 144 and the reflector 220 on the second wall portion 150, and a second sensor set 234 having the transmitter 140 and the receiver 146 on the second wall portion 150 and the reflector 220 on the first wall portion 144. Each sensor set 232 and 234 reflects the optical beam 156 off of the reflector 220 at an angle 236, such as between 1 and 170 degrees, 2 and 120 degrees, 3 and 90 degrees, 4 and 60 degrees, or 10 and 30 degrees.

The fourth sensor configuration 228 adds further enhancements to the third sensor configuration 226. In the fourth sensor configuration 228, the reflector 220 is disposed on a different wall portion 238 than the first wall portion 144 having the transmitters 140 and the second wall portion 150 having the receivers 146. The optical beam 156 from each transmitter 140 is split into respective first and second optical beams 240 and 242 by a beam splitter 244, such that the first optical beam 240 passes directly between the transmitter 140 and receiver 146 whereas the second optical beam 242 reflects off of the reflector 220 at an angle 246 between the transmitter 140 and the receiver 146. The angle 246 may be the same or different for each set of the transmitters 140 and receivers 146. The angle 246 may be between 20 and 175 degrees, 30 and 150 degrees, 40 and 120 degrees, 50 and 100 degrees, or 60 and 90 degrees. Each of the receivers 146 may independently receive the first and second optical beams 240 and 242 from the respective transmitters 140, or a beam combiner 250 may combine the first and second optical beams 240 and 242 as a single optical beam into each of the receivers 146. In certain embodiments, the beam splitters 244 may be integrated into the respective transmitters 140, or the beam splitters 244 may be separate from the respective transmitters 140 (e.g., mounted on the windows 142). Additionally, the beam combiners 250 may be integrated into the respective receivers 146, or the beam combiners 250 may be separate from the respective receivers 146 (e.g., mounted on the windows 148).

The fifth sensor configuration 230 may be substantially the same as discussed above with reference to FIGS. 4 and 5, including the transceivers 200 and reflectors 220 (e.g., reflectors 202 or 203) on opposite sides of the gas turbine enclosure 14. However, in the illustrated embodiment, the transceivers 200 are disposed on a wall portion 252 opposite from the wall portion 238 having the reflector 220, which is also different that the first and second wall portions 144 and 150 having the transmitters 140, the receivers 146, the transceivers 200, and the reflectors 20 of the first, second, and third sensor configurations 222, 224, and 226 and the transmitters 140 and the receivers 146 of the fourth sensor configuration 228. As a result, the optical beams (e.g., 210, 212) associated with the fifth sensor configuration 230 pass through the gas turbine enclosure 14 crosswise relative to the optical beams (e.g., 156, 210, and 212) associated with the first, second, third, and fourth sensor configurations 222, 224, 226, and 228, thereby defining an optical measurement grid of optical beams 254 inside of the gas turbine enclosure 14. The illustrated grid of optical beams 254 may improve the leak measurements in the gas turbine enclosure 14.

The leak detection system 12 of FIG. 6 operates substantially the same as discussed in detail above with reference to FIGS. 1-5. Accordingly, the leak detection system 12 is configured to monitor for changes in the optical beams associated with leakage of fluids (e.g., gaseous fuels or liquid fuel vapor) inside of the gas turbine enclosure 14. The various sensor configurations 222, 224, 226, 228, and 230 may be used alone or in combination with one another to provide redundancy in the leak detection measurements, improved accuracy in the leak detection measurements, and/or location specific data associated with leakage in the gas turbine enclosure 14.

Technical effects of the disclosed subject matter include non-intrusive, non-contact leak measurement techniques, which do not require any sampling of air from within a gas turbine enclosure 14. In particular, rather than extracting an air sample from the gas turbine enclosure 14, the disclosed measurement techniques use one or more leak sensors 20 disposed at windows (e.g., 142, 148) in the gas turbine enclosure 14. Thus, the leak sensors 20 are completely outside of the gas turbine enclosure 14, and the windows enable the leak sensors 20 to send and receive beams (e.g., optical beams, light beams, IR beams, etc.) through the internal space 158 of the gas turbine enclosure 14 to evaluate whether or not a leak is occurring in the gas turbine enclosure 14. The leak sensors 20 also may include one or more features to adapt the sensors 20 for use with the gas turbine system 10. For example, the leak sensors 20 may include the protective housing 184, the thermal control system 186 with the fluid injection ducts 187, and/or the vibration dampers 182.

This written description uses examples to describe various embodiments of the disclosed subject matter, including the best mode, and also to enable any person skilled in the art to practice the disclosed subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a leak detection system, comprising:
      a first window panel configured to mount at a first opening in a first wall portion in a gas turbine enclosure;
      a leak sensor configured to mount outside of the gas turbine enclosure, wherein the leak sensor is configured to transmit a beam from outside of the gas turbine enclosure through the first window panel and an interior of the gas turbine enclosure to obtain sensor feedback; and
      a controller configured to evaluate the sensor feedback to monitor for a leak of a hazardous fluid in the gas turbine enclosure.

2. The system of claim 1, wherein the leak sensor comprises a light sensor.

3. The system of claim 1, wherein the leak sensor comprises an open path infrared (OPIR) sensor.

4. The system of claim 1, wherein the leak sensor comprises a transmitter and a receiver.

5. The system of claim 4, wherein the leak detection system comprises a second window panel configured to mount at a second opening in a second wall portion in the gas turbine enclosure, the transmitter is disposed adjacent the first window panel, and the receiver is disposed adjacent the second window panel.

6. The system of claim 1, wherein the leak sensor comprises a transceiver.

7. The system of claim 6, wherein the leak detection system comprises a reflector configured to couple to the gas turbine enclosure opposite from the first window panel, the transceiver is disposed adjacent the first window panel, the transceiver is configured to transmit the beam through the first window panel toward the reflector, and the reflector is configured to reflect the beam back to the transceiver.

8. The system of claim 7, wherein the leak detection system comprises a second window panel configured to mount at a second opening in a second wall portion in the gas turbine enclosure, and the reflector is disposed adjacent the second window panel.

9. The system of claim 1, wherein the leak sensor is configured to mount adjacent an air vent exhaust of the gas turbine enclosure.

10. The system of claim 1, wherein the leak sensor is configured to mount on a removable roof panel of the first wall portion in the gas turbine enclosure, and the first window panel is configured to mount at the first opening in the removable roof panel of the first wall portion in the gas turbine enclosure.

11. The system of claim 1, comprising the gas turbine enclosure having the leak detection system, a gas turbine engine disposed in the gas turbine enclosure, or a combination thereof.

12. The system of claim 1, wherein the first window comprises a transparent panel, a glass panel, or a sapphire panel.

13. The system of claim 1, comprising a plurality of the leak sensors configured to couple to the gas turbine enclosure in a plurality of different locations, wherein the controller is configured to evaluate sensor feedback from the plurality of sensors to monitor for the leak of the hazardous fluid in the gas turbine enclosure.

14. The system of claim 13, wherein the controller is configured to estimate a location of the leak based on the sensor feedback from the plurality of sensors.

15. The system of claim 14, wherein the plurality of leak sensors define an optical measurement grid of optical beams.

16. The system of claim 1, comprising a sensor mount configured to mount the leak sensor externally to the gas turbine enclosure, wherein the sensor mount comprises at least one of a protective housing, a thermal control system, or a vibration damper, wherein the leak sensor is a self-contained sensor unit.

17. A system, comprising:
   a gas turbine enclosure having a first window panel mounted at a first opening in a first wall portion of the gas turbine enclosure; and
   a leak sensor mounted outside of the gas turbine enclosure adjacent the first window panel, wherein the leak sensor is configured to transmit a beam from outside of the gas turbine enclosure through the first window panel and an interior of the gas turbine enclosure to obtain sensor feedback, and the sensor feedback is evaluated to monitor for a leak of a hazardous fluid in the gas turbine enclosure.

18. The system of claim 17, wherein the leak sensor comprises an open path infrared (OPIR) sensor.

19. The system of claim 17, comprising a gas turbine engine disposed in the gas turbine enclosure.

20. A method, comprising:
   transmitting a beam from a leak sensor from outside of the gas turbine enclosure through a first window panel at a first opening in a first wall portion in a gas turbine enclosure and through an interior of the gas turbine enclosure to obtain sensor feedback, wherein the leak sensor is disposed outside of the gas turbine enclosure; and
   evaluating the sensor feedback, via a controller, to monitor for a leak of a hazardous fluid in the gas turbine enclosure.

* * * * *